United States Patent [19]

Sakamoto et al.

[11] Patent Number: 5,029,112
[45] Date of Patent: Jul. 2, 1991

[54] IMAGE INFORMATION DISPLAY SYSTEM FOR DISPLAYING A PLURALITY OF IMAGE INFORMATION PIECES WITH A DIRECTED DISPLAY STATE

[75] Inventors: Tatsuya Sakamoto, Hiratsuka; Hidefumi Masuzaki; Satoshi Ito, both of Odawara, all of Japan

[73] Assignee: Hitachi, Ltd., Tokyo, Japan

[21] Appl. No.: 286,699

[22] Filed: Dec. 20, 1988

[30] Foreign Application Priority Data

Dec. 23, 1987 [JP] Japan .................. 62-323922

[51] Int. Cl.⁵ .................. G06F 15/40; G09G 5/30
[52] U.S. Cl. .................. 364/521; 364/518; 340/723; 340/750
[58] Field of Search .................. 379/96; 364/518, 521, 364/188, 300; 340/798, 750, 723

[56] References Cited

U.S. PATENT DOCUMENTS

| | | | |
|---|---|---|---|
| 4,620,289 | 10/1986 | Chauvel | 364/521 |
| 4,691,340 | 9/1987 | Maeda et al. | 379/96 |
| 4,754,326 | 6/1988 | Kram et al. | 364/900 |
| 4,757,302 | 7/1988 | Hatakeyama et al. | 340/407 |
| 4,779,080 | 10/1988 | Coughlin et al. | 340/712 |
| 4,817,050 | 3/1989 | Komatsu et al. | 364/900 |
| 4,829,453 | 5/1989 | Katsuta et al. | 364/521 |
| 4,864,516 | 9/1989 | Gaither et al. | 364/518 |

FOREIGN PATENT DOCUMENTS

61-97784 5/1986 Japan .

Primary Examiner—Dale M. Shaw
Assistant Examiner—Raymond J. Bayerl
Attorney, Agent, or Firm—Fay, Sharpe, Beall, Fagan, Minnich & McKee

[57] ABSTRACT

The present invention relates to an image information display system capable of displaying a specific unit image information piece with a method which is different from that of other image information pieces, in an electronic filing system for consecutively displaying a plurality of unit image information pieces at predetermined time intervals. An image information display system according to the present invention comprises a memory device having a region for storing image information pieces and a region for storing information pieces directing the display states for respective unit image information pieces, a display device for consecutively displaying unit image information pieces at predetermined time intervals, a device for successively reading out unit image information pieces from the memory device, and a control device for controlling the display device so that the unit image information piece thus read out may assume a display state on the basis of the information piece directing the display state.

6 Claims, 8 Drawing Sheets

|  | REGISTER 19 | REGISTER 20 | REGISTER 21 | REGISTER 22 |
|---|---|---|---|---|
| R – DATA | 1 | 0 | 1 | 1 |
| G – DATA | 1 | 0 | 1 | 0 |
| B – DATA | 1 | 0 | 1 | 0 |
| DISPLAY COLOR | WHITE | BLACK | WHITE | RED |
| DISPLAY FORM | NORMAL DISPLAY | | EMPHASIS DISPLAY | |

35. IMAGE BUFFER CHANGE OVER TIMING

36. IMAGE MEMORY A READ/WRITE TIMING  RD WT RD WT RD

37. IMAGE MEMORY B READ/WRITE TIMING  WT RD WT RD WT

38. MARKING SIGNAL TIMING  NORMAL EMPHASIS NORMAL EMPHASIS NORMAL

39. COLOR REGISTER REWRITING TIMING  P

40. CRT DISPLAY TIMING  NORMAL DISPLAY EMPHASIS DISPLAY NORMAL DISPLAY EMPHASIS DISPLAY

|  | REGISTER 19 | REGISTER 20 | REGISTER 21 | REGISTER 22 |
|---|---|---|---|---|
| R-DATA | 1 | 0 | 1 (0) | 1 (1) |
| G-DATA | 1 | 0 | 1 (0) | 0 (1) |
| B-DATA | 1 | 0 | 1 (0) | 0 (1) |
| CORRESPONDING DISPLAY COLOR | WHITE | BLACK | WHITE (BLACK) | RED (WHITE) |
| DISPLAY FORM | NORMAL DISPLAY | | EMPHASIS DISPLAY | |

IMAGE INFORMATION DISPLAY SYSTEM FOR DISPLAYING A PLURALITY OF IMAGE INFORMATION PIECES WITH A DIRECTED DISPLAY STATE

BACKGROUND OF THE INVENTION

The present information relates to an image display system which is applicable to an electronic filing system for reading out image information stored in a memory device and for outputting the image information to a display device, and in particular to an image display system for successively displaying a plurality of pieces of image information read out from, an image memory device having unit image information stored therein on a display; device such as a CRT display and for displaying a particular one of the image information piece with a different display state.

When an objective image information unit or piece of the unit is to be retrieved out of stored image information units in an electronic filing system storing a large amount of image information, it is typical that the objective image information is automatically retrieved by using index information such as a predetermined document name, a classification name or a keyword. Frequently, selection of a desired image information piece or unit having several image information pieces is attempted. In some cases, however, the desired image information unit or piece of the unit is not necessarily extracted by the automatic retrieval on the basis of only the index information inputted by the operator, and a plurality of candidate unit or piece image data are obtained with respect to a certain index information piece that has been inputted.

In some cases, the operator does not memorize the desired image information correctly and hence the operator cannot remember the index information. In these cases, the objective image information is searched for in accordance with only a general idea of the appropriate index information.

In these cases, the operator must select the desired image information piece while observing a plurality of candidate image information pieces extracted by automatic retrieval and displayed on the display apparatus.

An image information retrieval device is described in a patent application in Japan filed by Canon Corporation on Oct. 18, 1984 and laid open as JP-A-61-97784 on May 16, 1986. This device facilitates a visual check by the operator of a plurality of retrieved candidate data on the display at predetermined time intervals to realize a function similar to turning the pages of a book at high speed, for example. When the objective image is found, the operator inputs a stop command via a keyboard, for example, to stop the switching of the displays of the image.

The display of image information in an electronic filing system will now be described by referring to FIGS. 1A and 1B. It is now assumed that the operator wants to look at a specific page of a desired document. The operator inputs index information relating to the document such as a keyword into the system via an input device of the system. The system retrieves a document containing that keyword in a document storage file device to select pertinent documents. In this case, the number of selected documents is not limited to one. Instead plurality of documents (constituting a document group) are often selected. The display capability of the screen is exceeded when all of the selected documents on the display device are displayed at a time. Accordingly, parts of respective documents are reduced in size and displayed or a list containing titles of documents and summaries of their contents is displayed on the screen so that the operator may watch the screen and select a desired document via the input device. When a plurality of documents have been selected, the operator observes pages of respective documents successively display on the display screen by using the page turning function of the system and selects a page of a desired document.

Figure 1A:
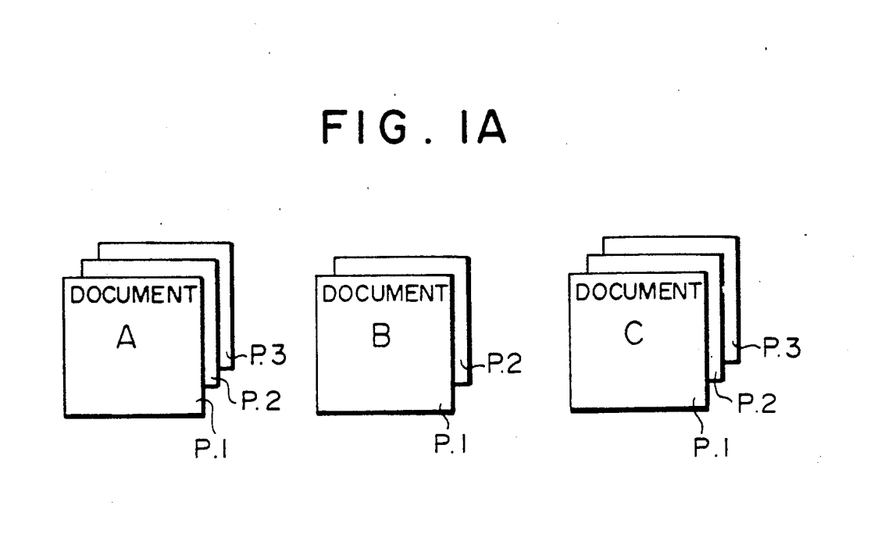
FIGS. 1A and 1B are diagrams used for explaining the display method of image information in an electronic filing system.
Figure 1B:
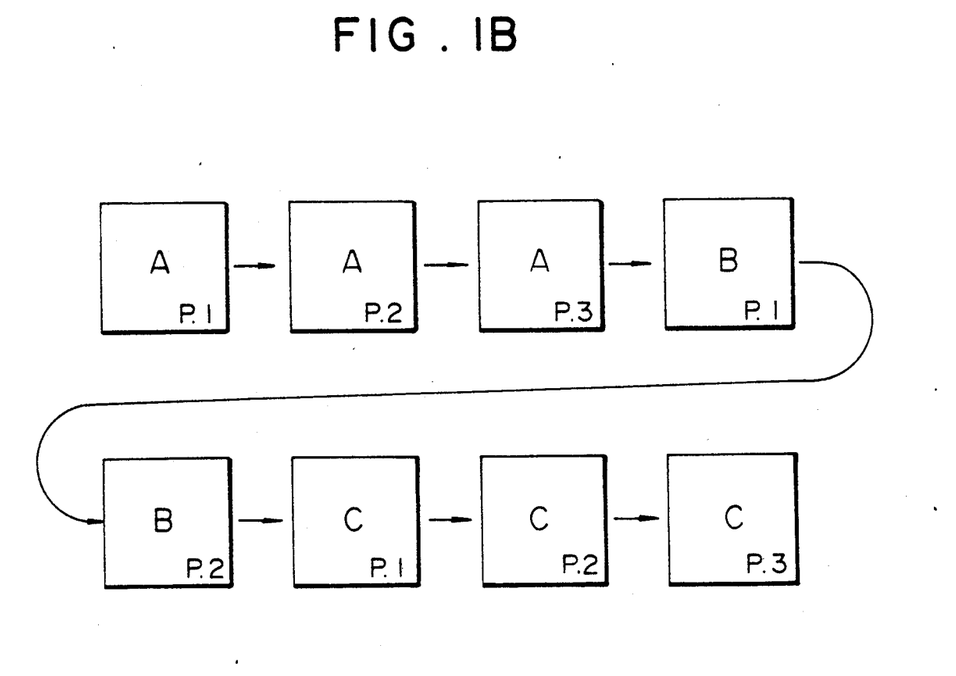

FIG. 1A shows a state in which a group of documents A, B and C have been selected as candidates by the automatic retrieval operation of the system. The document A contains three pages of P. 1 to P. 3 and the document B contains two pages of P. 1 and P. 2 whereas the document C contains three pages of P. 1 to P. 3. On the display screen, all of the three documents may be displayed as shown in FIG. 1A (where respective pages are overlapped and displayed), or alternatively a list of the titles of the documents may be displayed. If the operator selects the page turning feature via the input device, the screen changes in the direction of arrows illustrated in FIG. 1B each predetermined time interval. First of all, P. 1 (the first page) of the document A is displayed on the screen for approximately one second. Subsequently, P. 2 (the second page) of the same document A is displayed for approximately one second. A page of each document is thus displayed every one second, and the display of the documents ends with P. 3 (the third page) of the document C. If a desired document page is found during that time, the operator stops the turning of the pages.

In the above described electronic filing system, image information data are stored in an image storage device (such as a magnetic recording device or an optical disk device) while taking a series of "documents" each comprising one or more pages as one unit., and the retrieval processing is also performed while retrieving the documents as one unit.

When a plurality of document images extracted by the retrieval are consecutively displayed on the screen at predetermined time intervals, they are displayed by document page rather than by the document as a unit. The duration of display of any document page is identical, and the switching time between pages is also uniform.

Therefore, it is difficult for the operator to determine the boundary between different documents in a moment. Oversight or misjudgment of the image of the desired page is often caused by oversight of the boundary between different documents.

Further, in many documents (such as patent specifications), important bibliographic matters of the document are described on the first page of the document. It is thus one of the important objects to make the first page of each document easily recognizable to an operator.

SUMMARY OF THE INVENTION

An object of the present invention is to provide, in an electronic filing system for consecutively displaying a plurality of unit image information pieces at predetermined time intervals, an image information display apparatus capable of displaying a specific image information piece with a display method which is different from that of other image information pieces.

An apparatus for attaining the object of the present invention comprises a memory device for storing image information pieces and for storing information pieces directing the display states for the respective unit image information pieces, a display device for consecutively displaying unit image information pieces at predetermined time intervals, a device for successively reading out unit image information pieces from the memory device, and a control device for controlling the display device so that the unit image information piece thus read out may assume a display state on the basis of the corresponding information piece directing the display state.

In accordance with a first aspect of the present the display directing information pieces direct the display to change the image to an arbitrary color, and the display device displays the specific image information the arbitrary color on the basis of the display directing information piece.

In accordance with a second aspect of the present invention, information pieces directing the display state direct the display of a corresponding image information pieces with a different luminance value, and the display device displays the specific image piece with a luminance value which is different from that of the other image information pieces.

In accordance with a third aspect of the present invention, information pieces directing the, display state direct the display of an image so that the conventional monochrome image is inverted, and the display device displays specific image information pieces with black and white colors mutually inverted.

In accordance with a fourth aspect of the present invention, display directing information pieces direct the display of images while blinking them, and the display device displays specific unit image information pieces while blinking them.

In accordance with a fifth aspect of the present invention, information pieces indicating display states direct the display of a specific image information piece under the condition that the display dimensions of the image pieces are expanded or compressed, and the display device displays specific unit image information pieces with dimensions expanded or compressed.

In accordance with a sixth aspect of the present invention, information pieces directing display states direct the display to have patterns mixed wi&.h unit image information pieces, and the display device displays specific unit image information pieces with patterns overlapped.

In accordance with a seventh aspect of the present invention, information pieces directing display states direct that the display of a corresponding unit image information piece, be stopped and the display device stops the change over display of specific unit image information pieces.

In accordance with an eighth aspect of the present invention, display directing information pieces direct the generation of an alarm tone, and the display device further has a voice generation device that generates the alarm tone when specific unit image information pieces are displayed.

In accordance with the present invention, in an image display apparatus consecutively displaying a plurality of unit image information pieces at predetermined time intervals in an electronic file system, unit image information pieces including display directing information pieces, which specify image pieces that are important to the operator are displayed with a display state such as a display color changed with respect to a conventional image display. The attention of the operator is thus aroused. This results in an effect that oversight of important images in visual retrieval of images is reduced and the efficiency of visual retrieval of the images is largely improved.

DESCRIPTION OF THE PREFERRED EMBODIMENTS

Embodiments of the present invention will now be described in detail by referring to the drawings.

Figure 2:
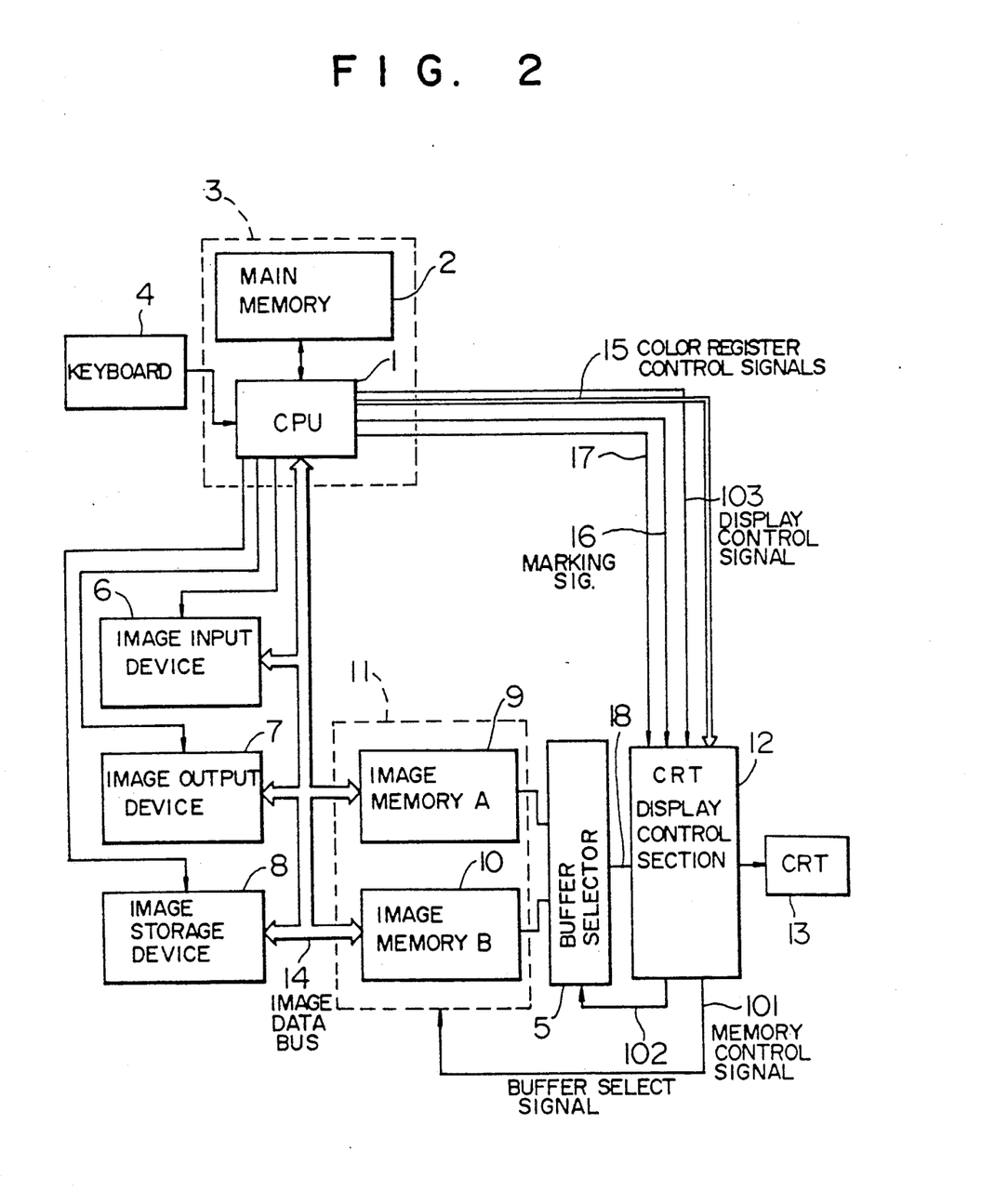
FIG. 2 is a block diagram showing the configuration of an embodiment of a display device according to the present invention.

FIG. 2 is a block diagram of an image display device which is an embodiment of the present invention.

A main control section 3 comprises a CPU 1 and a main memory 2 and administers the present apparatus. The CPU 1 is a microprocessor for controlling respective sections included in the apparatus. A program for activating the CPU 1 is stored in the main memory 2. Further, the main memory 2 is also used as a work area for activating the CPU 1.

The present apparatus is operated by an operator via a keyboard 4. An image input device 6 is a device such as an image scanner which scans an input document in a two dimensional manner and performs photoelectric conversion. The image input device 6 assigns each pixel of each of the image information piece a binary datum "1" (black pixel) or "0" (white, pixel), and supplies each to an image data bus 14. Together, the image data constitute monochrome image information pieces. An image output device 7 is an image printer such as a laser beam printer and outputs the image information pieces supplied from the image data bus 14 in the form of hard copies. An image storage device 8 is a memory device such as a magnetic disk or an optical disk and stores the image information pieces supplied from the image data bus 14. On the basis of control from the main control section 3, the image storage device 8 reads out a necessary image information piece out of the image information pieces stored therein, and supplies it to the image data bus 14. The image buffer memory 11 comprises an image memory 9 and an image memory 10 and temporarily holds image information pieces supplied from the image data bus 14. The image buffer memory 11 has two image memories so that the writing operation of the pertinent memory and reading operation thereof may be performed in parallel. Each of the image memories 9 and 10 holds unit image information pieces corresponding to one page of a document. An image buffer memory selector 5 is a selector for selecting unit image information pieces to be supplied to a CRT display control section 12, and alternately selects image information pieces held in the image memory 9 and the image memory 10. This selection is performed in accordance with a buffer select signal 102 which is generated on the basis of an image buffer changeover signal 17 supplied from the main control section 3.

The CRT display control section 12 performs read control and write control of the image buffer memory 11 and generates display timing. Further, the CRT display control section 12 performs control so as to display unit image information pieces selected by the image buffer memory selector 5 on a CRT in monochrome or in color. Either monochrome display or color display is selected on the basis of a color register control signal group 15 and a marking signal 16. A CRT 13 is a color CRT display for displaying image information pieces held in the image memory 9 or the image memory 10.

The CRT display control section 12 shown in FIG. 2 will now be described by referring to FIG. 3.

Figure 3:
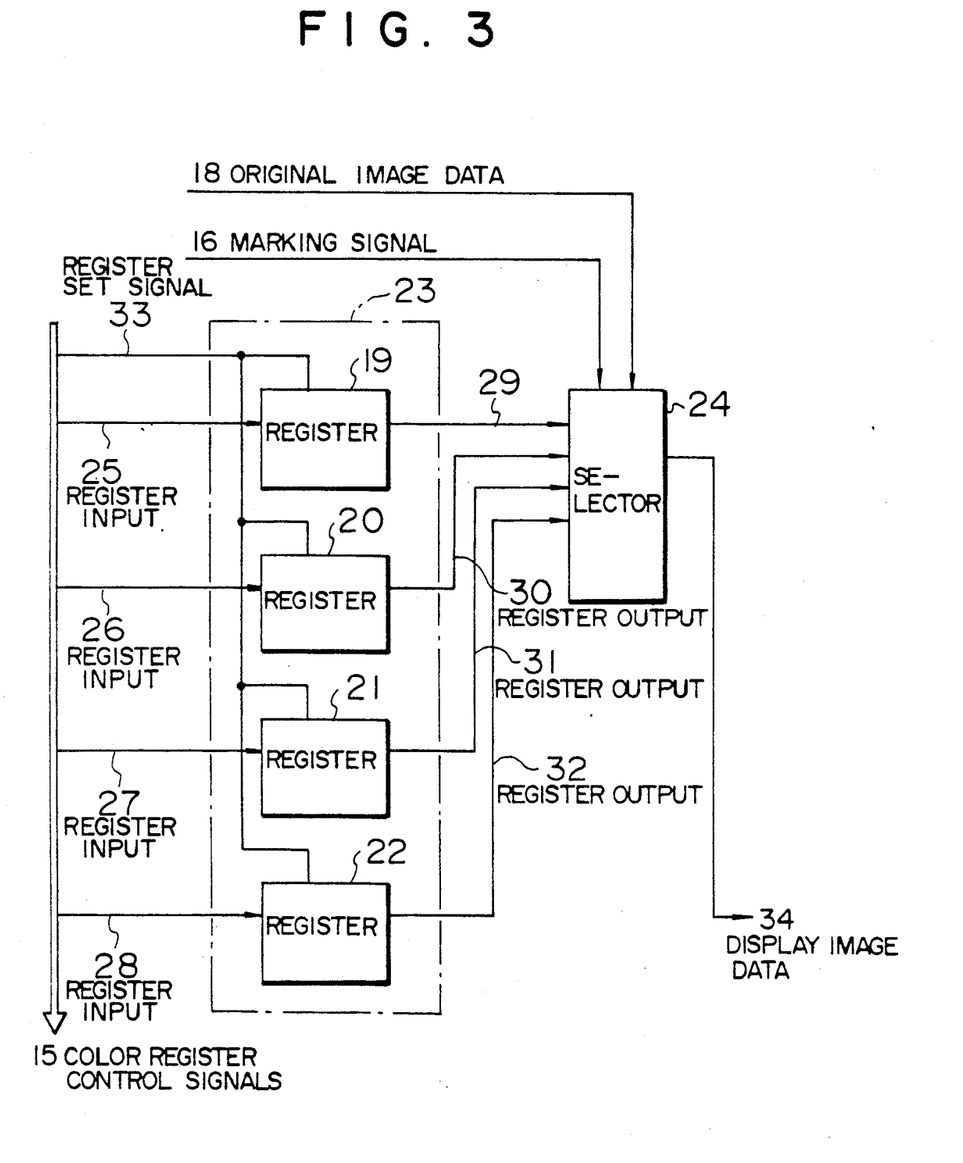
FIG. 3 is a detailed block diagram of an embodiment of a CRT display control section shown in FIG. 2.

FIG. 3 is a block diagram showing the internal configuration of the CRT display control section. A color register 23 has four registers comprising a register 19, a register 20, a register 21 and a register 22. On the basis of a directive from the main control section 3, 3-bit data comprising R(red), G(green) and B(blue) bits are held in respective registers 19 to 22. The operator beforehand directs the main control section 3 to set data into the four registers via the keyboard 4. A selector 24 selects and outputs one of the register outputs 29 to 32 on the basis of whether the marking signal 16 is present or not and whether the datum of each pixel is present or not as an original image datum 18.

The operation of the CRT display control section 12 will now be described. Setting of data into the color register 23 is performed by the main control section 3 via the color register control signal group 15. The color register control signal group 15 comprises a register set signal 33, a register input 25, a register input 26, a register input 27, and a register input 28. Each of the register inputs 25 to 28 comprises three signal lines R, G and B. The main control section 3 outputs the RGB data to be set into the respective registers on respective register inputs 25 to 28 and issues the register set signal 33. As a result, respective register signals are set into respective registers 19 to 22.

Figure 4:
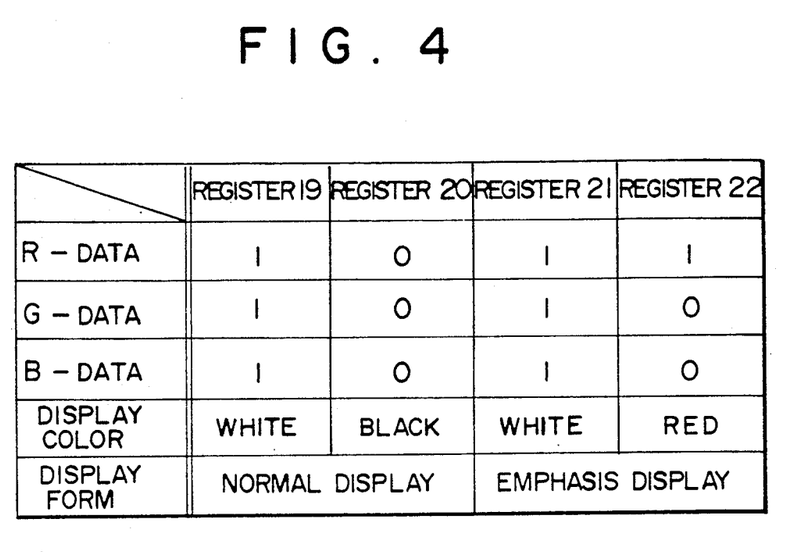
FIG. 4 is a diagram used for explaining the setting of data in the color registers shown in FIG. 3.

Contents of the RGB data set into the respective registers 19 to 22 are shown in FIG. 4. Initial values are set into respective registers 19 to 22 as shown in FIG. 4.

When normal display is carried out, the register 19 and the register 20 are used, and the image is displayed with white and black colors, resulting in a monochrome display. When an image is displayed under a changed display state (hereafter referred to as "emphasis display"), the register 21 and the register 22 are used, and the image is displayed with white and red colors, resulting in a color display.

With reference to FIG. 3, the output signals of the respective registers are outputted as register outputs 29, 30, 31 and 32. Each of the register outputs 29, 30, 31 and 32 comprises three signal lines R, G and B. (In FIG. 3, however, three signal lines are represented by one signal line.) The selector 24 is supplied with register outputs 29 to 32 as input signals; and the marking signal 16 and the original image datum 18 as select control signals for outputting the display image data 34. The display image data 34 outputted from the selector 24 comprises three signal lines R, G and B. (In FIG. 3, however, the three signal lines R, G and B are represented by one signal line.) When the marking signal 16 is not issued, the selector 24 selects the register 19 provided that the original image datum 18 is "white" ("0"), whereas the selector 24 selects the register 20 provided that the original image datum 18 is "black" ("1"). When the marking signal 16 is issued, the selector 24 selects the register 21 provided that the original image datum 18 is "white" ("0"), whereas the selector 24 selects the register 22 provided that the original image datum 18 is "black" ("1").

The operation of retrieving image information pieces stored in the image storage device 8 shown in FIG. 2 and displaying them on the CRT 13 will now be described.

When index information corresponding to a desired document's name is inputted via the keyboard 4 together with a retrieval command, this index information is sent to the main control section 3 to automatically retrieve a desired image. It is now assumed that the image information obtained by retrieval comprises a plurality of documents, and each document comprises a plurality of pages.

Among a plurality of image information pieces extracted by retrieval, a first page of a first document is sent from the image storage device 8 to the image memory 9 via the image data bus 14, and a unit image information piece corresponding to one page is written into the image memory 9. The unit image information piece thus written represents a monochrome image comprising binary-valued data wherein "1"s represent black pixels and "0"s for represent white pixels. For this unit, image information held in the image memory 9 is selected by the image buffer memory selector 5 and outputted to the CRT display control section 12 so that display on the CRT 13 is thus started.

When image information pieces stored in the image memory 9 begin to be outputted to the CRT display control section 12, a second page of the first document is sent from the image storage device 8 to the image memory 10 via the image data bus 14 concurrently therewith and a unit image information piece corresponding to one page is written into the image memory 10. If this writing operation is finished and the unit image information piece stored in the image memory 9 is displayed on the CRT 13 for a predetermined time, say, for approximately one second, the image buffer changeover signal 17 is issued by the main control section 3. The unit image information piece held in the image memory 10 thus begins to be outputted to the CRT display control section 12 by the image buffer memory selector 5 and begins to be displayed on the CRT 13. Concurrently therewith, a unit image information piece on the next page is written into the image memory 9 in the same way as that described before.

By repeating the above described operation, image information pieces of the first page to the last page of the first document, then the first page to the last page of the second document, and so on are successively displayed on the CRT 13 at predetermined time intervals.

At this time, images are displayed monochromatically on the CRT 13 under normal conditions. However, a specific image information piece can be displayed in color. This specific piece is specified by the main control section 3 in accordance with, emphasis display or display directing information stored in the image storage device 8 that corresponds to the specific piece.

The above described emphasis display information stored in the image storage device 8 will now be described by referring to FIGS. 5 and 6.

Figure 5:
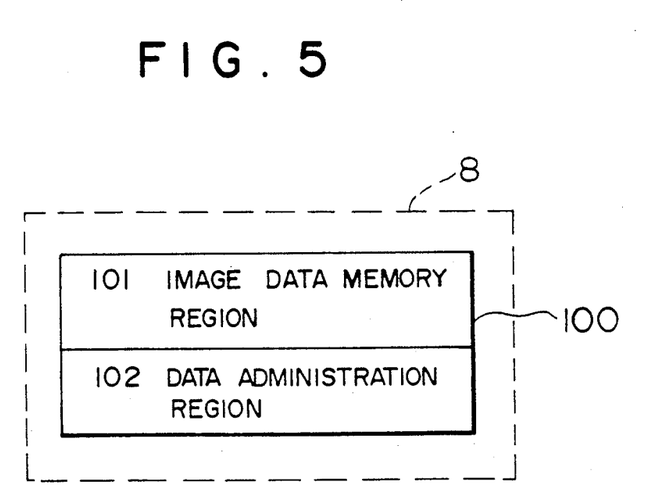
FIG. 5 shows the data storage regions of an image storage device according to the present invention.
Figure 6:
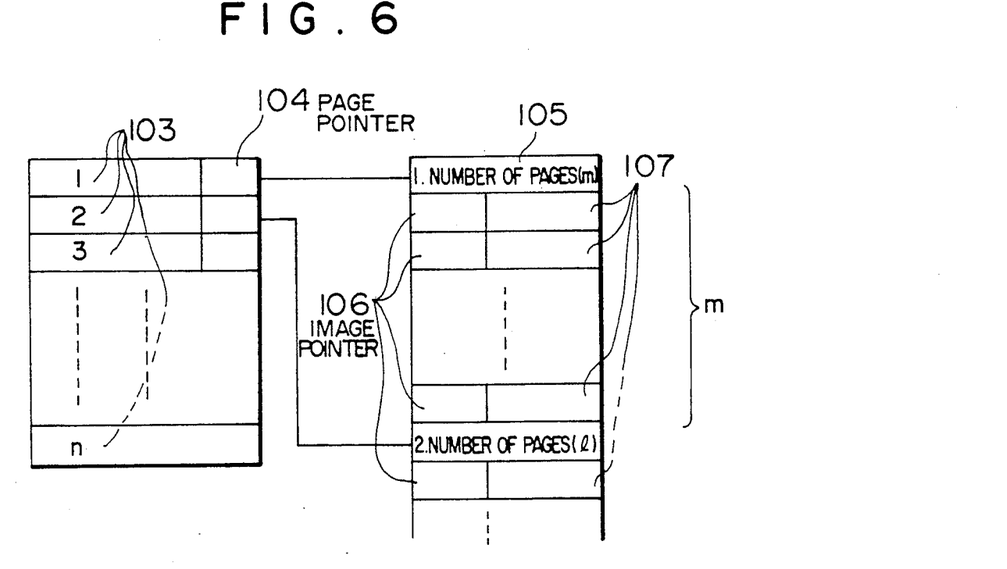
FIG. 6 shows the structure of a data administration region of FIG. 5 in further detail.

FIG. 5 shows the storage state of the image information stored in the image storage device 8. A memory region 100 included in the image storage device 8 is divided into an image data memory region 101 and a data administration or non-image data region 102.

Actual image information data are stored the image data memory region 101.

In the data administration region 102, the storage position of input image information in the image storage device 8, the title of the image information, and the information indicating whether the image information is specific image information to be emphasized in display are stored for every image information piece of a unit.

The data administration region 102 will now be described in detail by referring to FIG. 6.

Title information pieces of inputted documents are stored in a title information storage area 103, and the storage position (address) of data administration information for each page of the document is specified by a page pointer. A region specified by the page pointer 104 has a "number of pages" information storage area 105 for storing information representing the number of pages of the pertinent document, an image pointer 106 for specifying the storage position (address) of the image data of each page, and an emphasis display flag area 107 storing information for specifying that an image information piece of each page should be displayed with emphasis.

Assuming now that n documents are stored, the example, n title storage areas 103 are provided. Further, the first one of n documents has m pages, one "number of pages" information storage area 105, m image pointers 106, and m emphasis display flag areas 107.

When image information is inputted from the image input device 6 to the image storage device 8, the operator specifies via the keyboard 4 whether the image should be emphasized or not when it is displayed on the CRT. In an emphasis display flag area 107 of the image information desired to be displayed with emphasis, a flag is established in the form of binary datum.

When retrieval is executed, the information stored in the emphasis display flag area 107 is also read. In accordance with the information thus read, the marking signal 16 for displaying an image with emphasis is issued by the main control section 3.

Figure 7:
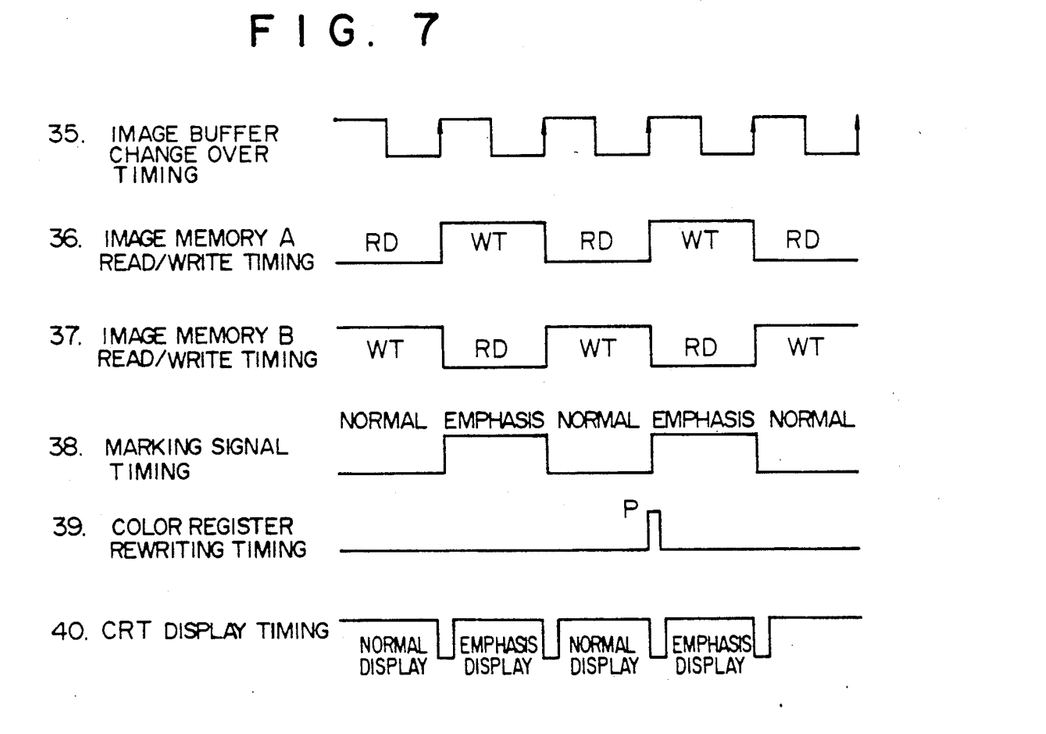
FIG. 7 is a timing chart used for explaining display operation and emphasis normal operation in an embodiment of the present invention.

A time chart showing the operation performed at various parts when the normal display or emphasis display is executed will now be described by referring to FIG. 7.

Unit image data read out from the image memory 9 and the image memory 10 are changed over by image buffer changeover timing 35 (signal 17) and are read out alternately. Image memory A read/write timing 36 and image memory B read/write timing 37 are timing signals directing the operation of the image memory 9 and the image memory 10 and are generated by the CRT display control section on the basis of the image buffer changeover signal 17 supplied from the CPU 1. The timing signals 36 and 37 are supplied to the buffer selector 5. RD represents a state in which image information is being read out from an image memory, whereas WT represents a state in which image information is being written into an image memory. The unit image information pieces read out are consecutively and alternately displayed on the CRT 13 at predetermined time intervals.

If the marking signal (emphasis display directing signal) 16 is issued in response to marking signal timing 38, registers selected in the color register 23 are so changed that the screen may be changed to the emphasis display screen comprising white and red colors. With respect to marking signal timing 38, emphasis display images are obtained in sections BC and DE, whereas normal display images are obtained in sections AB, CD and EF. With respect to CRT display timing 40, emphasis display on the screen is obtained in sections 42 and 44, whereas normal display on the screen is obtained in sections 41 and 43.

Further, at color register rewriting timing 39, the display color can be changed by changing and setting the contents of respective registers in the color register 23. Assuming now that the emphasis display color in the section BC of the marking signal 38 is red and the content of the register 21 is changed at a point P of the color register rewriting timing 39, for example, the display color becomes a different color such as, for example, "blue" when emphasis display is resumed in the section DE. Accordingly, it is possible to perform emphasis with a plurality of color kinds by changing the combination of R, G and B.

The display operation of the present embodiment will now be described by referring to FIG. 8.

Figure 8:
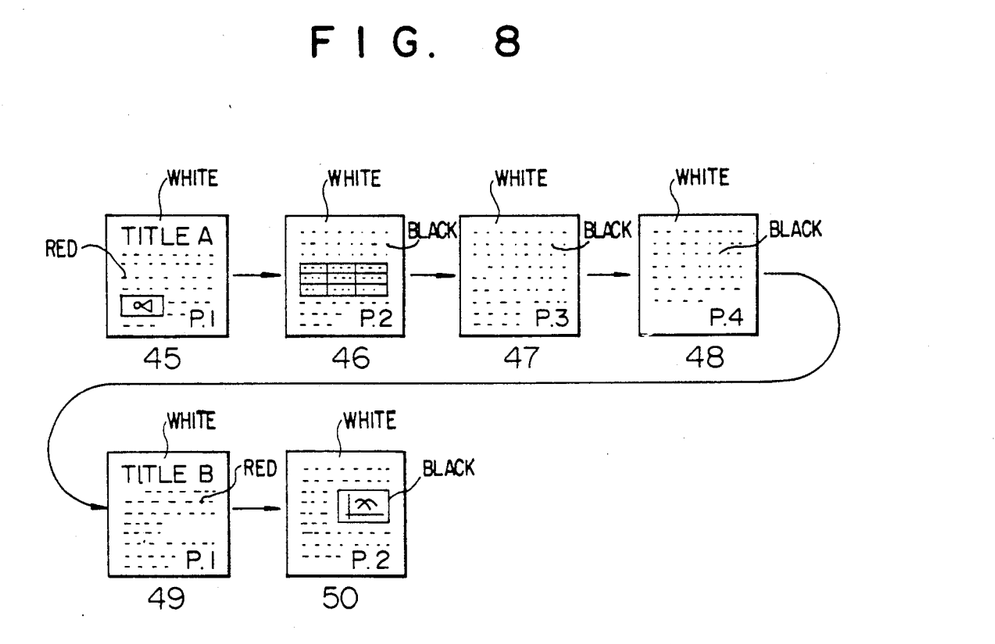
FIG. 8 is a diagram used for explaining the display operation in an image display apparatus of the present invention.

Images 45 to 50 of FIG. 8 are actually displayed on the CRT 13 in the order indicated by the arrows. In the images 45 to 48, one document (a first document) comprises four pages. In the images 49 and 50, one document (a second document) comprises two pages.

If these two documents are consecutively displayed on the CRT 13 at predetermined time intervals, the images 45 to 50 are consecutively displayed while being switched at intervals of one second, for example. The display time can be changed on the basis of the volume of unit image information.

In the images 45 and 49 representing first pages of respective documents, the background is represented by white and the image is represented by red, resulting in color display. In the remaining images 46 to 48 and 50, the background is represented by white and the image is represented by black, resulting in monochrome display. Even if the images 45 to 50 are consecutively displayed at predetermined time intervals, therefore, respective first pages (45, 49) of the first document and the second document are displayed in red. Accordingly, the boundary between the documents can be recognized at a look. Further, since a first page of a document generally containing important information is displayed in color, the possibility of oversight by the operator can be reduced.

In the present embodiment, only the images on the first pages are displayed with emphasis as described above. When these images to be displayed with emphasis are stored the image storage means, they are stored together with information indicating that they should be displayed with emphasis. That is to say, according to one embodiment a flag indicating that the image information should be displayed with emphasis is established in the emphasis display flag area 107 shown in FIG. 6. This registering can be performed by configuring an electronic file system so that a flag may be automatically established as the emphasis display flag 107 for a first page of a document when image information is stored the image storage means 8. Alternatively, the operator may perform registration manually.

When the operator wants to display a specific important image, which is not limited to a first page, with emphasis, it can be displayed with emphasis by manually establishing a flag in the emphasis image flag area 107 of that image beforehand as described above, for example.

When image information pieces retrieved in an electronic file apparatus are consecutively displayed at predetermined time intervals, important image information pieces are displayed with a different color in the present embodiment heretofore described. Therefore oversight is significantly reduced, resulting in an improved retrieval efficiency.

Various modifications such as, for example, those described below may be applied to the present embodiment without departing from the spirit of the present invention. In variants described below, a color image tube need not necessarily be used as the CRT 13.

Figure 9:
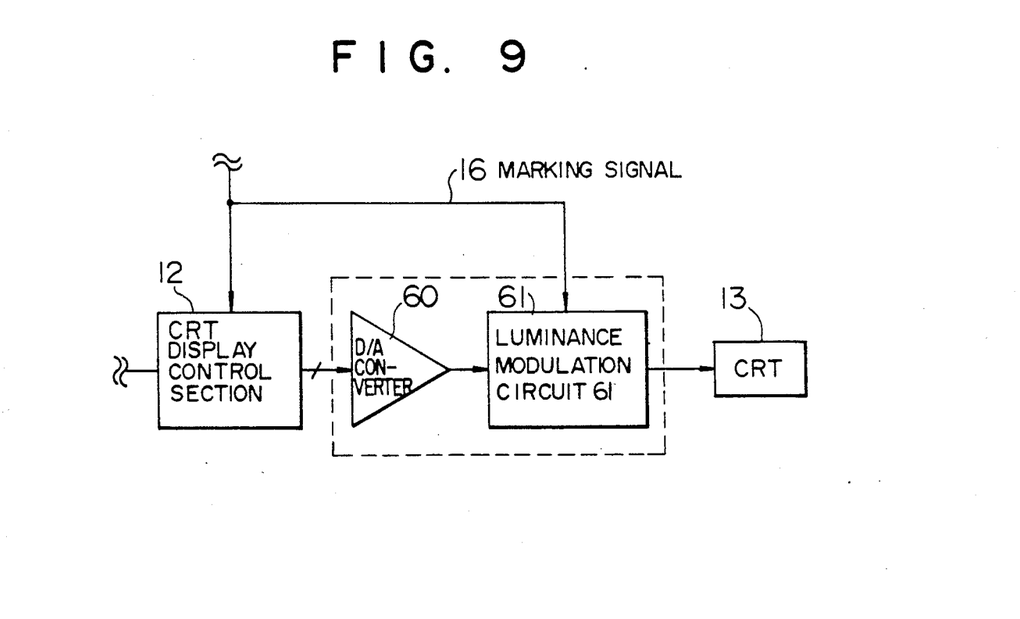
FIG. 9 is a block diagram showing a principal part of a second embodiment of an image display apparatus according to the present invention.

FIG. 9 shows the principal part of a second embodiment of the present invention. A portion of FIG. 9 surrounded by broken lines is connected between the CRT display control section 12 and the CRT 13 of the embodiment shown in FIG. 2. In the second embodiment, specific unit image information pieces are displayed with a display luminance changed from that of other image information pieces (such as, for example, a stronger display luminance than that of other image information pieces). The RGB digital signal supplied from the CRT display control section 12 is converted into an analog signal by a D-A converter 60. In accordance with the marking signal 16, a luminance modulation circuit 61 applies luminance modulation to the analog RGB signal. As a result, a specific unit image information piece directed to be displayed with emphasis is displayed with higher luminance.

Figure 10:
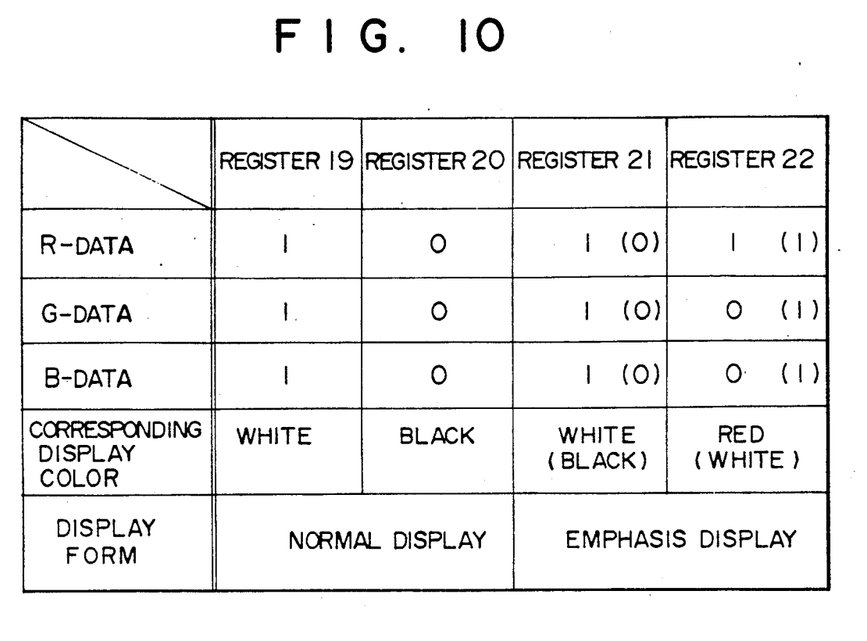
FIG. 10 is a block diagram showing a principal part of a third embodiment of an image display apparatus according to the present invention.

FIG. 10 shows the setting of registers included in the CRT display control section 12 in a third embodiment of the present invention. In the third embodiment, the basic configuration of the apparatus is substantially the same as that of FIG. 2. By setting the registers 21 and 22 respectively so as to satisfy the relations (R, G, B)=(0, 0, 0) and (R, G, B)=(1, 1, 1), black and white in the image are mutually inverted in the emphasis display (the image is displayed in inverse video).

Figure 11:
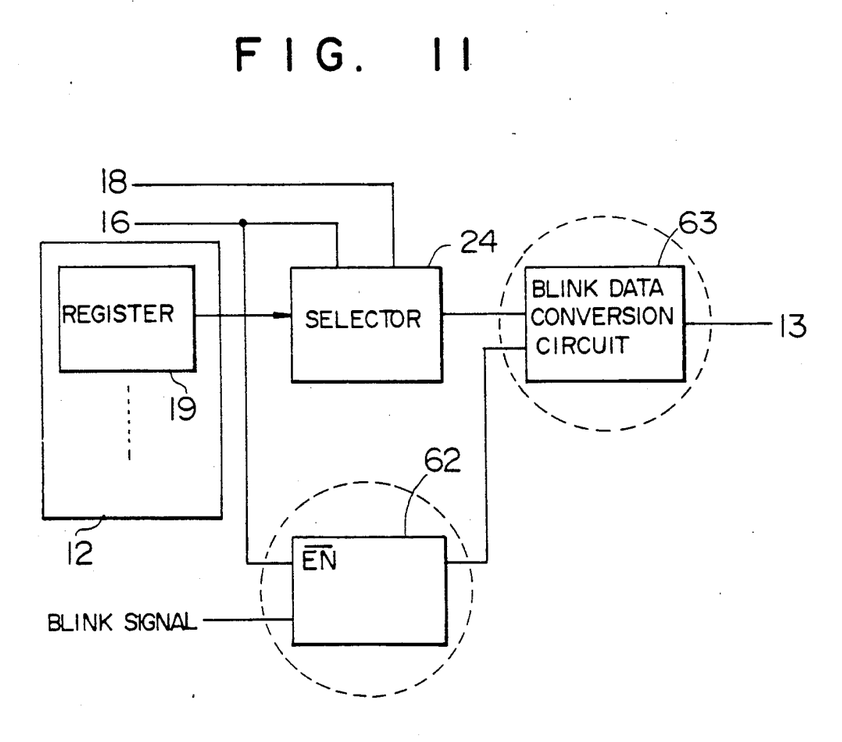
FIG. 11 is a block diagram showing a principal part of a fourth embodiment of an image display apparatus according to the present invention.

FIG. 11 shows a principal part of a fourth embodiment of the present invention. Portions of FIG. 11 surrounded by broken lines are function elements further added to the configuration of the embodiment shown in FIG. 2. In the fourth embodiment, a specific image information piece is displayed on the screen while it is being blinked. A blink control register 62 receives a blink signal and the marking signal 16 and specifies the blink display period. Upon receiving a specific image information piece from the selector 24, a blink data conversion circuit 63 blinks the image during the blink directive period. As the blink control register and the blink data conversion circuit, known devices can be used.

Figure 12:
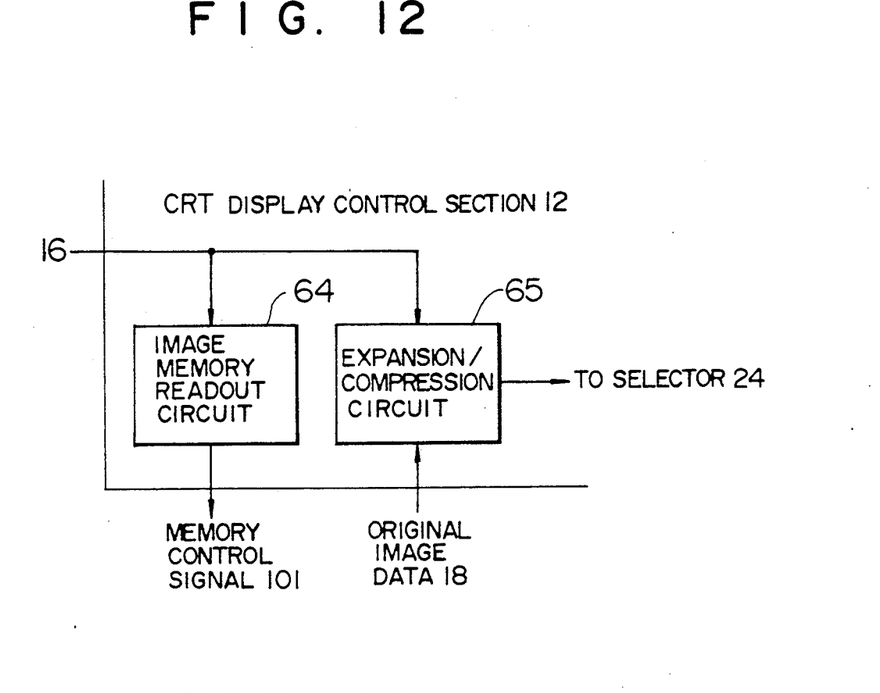
FIG. 12 is a block diagram showing a principal part of a fifth embodiment of an image display apparatus according to the present invention.

FIG. 12 shows a principal part of a fifth embodiment of the present invention. In this embodiment, a specific unit image information piece is displayed with the display dimension expanded or compressed. In the CRT display control section 12 of FIG. 12, an image memory readout circuit 64 and an expansion/compression circuit 65 are added. In response to the marking signal 16, the operation of reading out of the image memories 9 and 10 is controlled by the read address in the image memories according to a predetermined expansion or compression rate so as to provide an image in expansion or compression in the vertical direction of the display. The image expansion or compression in the horizontal direction of the display is made by expanding processing or thinning-out processing of each datum by the expansion/compression circuit 65. The expansion or compression rate is set in the internal registers in the image memory readout circuit 64 and the expansion/compression circuit 65 as a display control signal 103 by the CPU. Further, original image data 18 sent from the memory undergoes data conversion in the known expansion/compression circuit. The unit image information desired to be emphasized is thus displayed with the dimension expanded or compressed.

Figure 13:
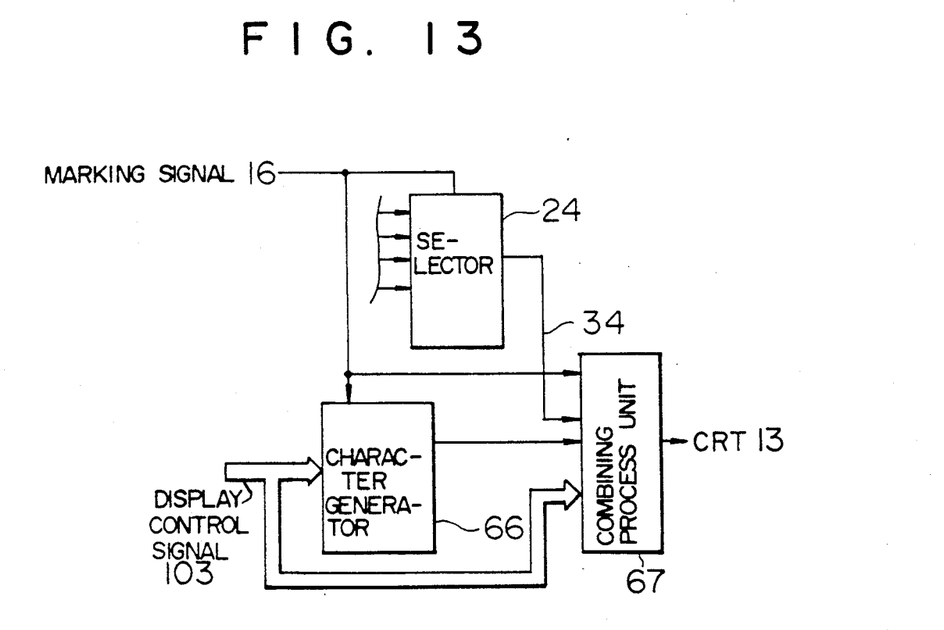
FIG. 13 is a block diagram showing a principal part of a sixth embodiment of an image display apparatus according to the present invention.

FIG. 13 shows a principal part of a sixth embodiment of the present invention. In this embodiment, a specific unit image information can be displayed with a pattern or a character superposed thereon. A known character generator 66 generates a pattern desired to be superposed on the image information (such as bordering lines or a pattern having such a shape as to arouse the attention of the operator). On the basis of the directive of the marking signal 16, the pattern is superposed on the unit image information piece in a combining process unit 67 and supplied to the display device 13. The method of the combining process is previously stored in the internal register in the combining process unit 67 via the display control signal 103 by the upper CPU.

In a seventh embodiment of the present invention, the display screen is fixed so that the sequential display is interrupted. When a specific unit information is displayed, its image is fixed and displayed. Concurrently with the appearance of the marking signal 16, the changeover of the buffer select signal 102 is stopped. As a result, the readout memory in the image buffer memory 11 is fixed. The display fixing time can be arbitrarily set by providing a timer in the CRT display control section 12.

In an eighth embodiment of the present invention, an alarm horn is generated concurrently with the display of specific image information piece of the unit. The display device further comprises an audio signal generation device and a speaker. In response to the marking signal 16, the audio signal generation device is activated to drive the speaker.

In the above described embodiments, a flag is established beforehand in the emphasis display flag area 107 corresponding to an image to be displayed with emphasis. Alternatively, however, the operator may direct on the keyboard when the image to be displayed with emphasis is retrieved.

In the aforementioned embodiments, the emphasis display flag area 107 need not necessarily be provided in the image storage device 8. Alternatively, it is also possible that the software recognizes page information, for example, used as the display directing information and changes the display state.

We claim:

1. An image information display system, comprising:
   image information storage means for storing image information including a plurality of unit image information having image information pieces and for storing corresponding information directing a display state of each of said image information pieces, wherein the directed display state is different for predetermined ones of said image information pieces as compared with the display state of the other of said image information pieces;
   display means for consecutively displaying a plurality of said image information pieces at predetermined time intervals;
   means for successively reading out a plurality of said image information pieces and said corresponding information directing the display state stored in said image information storage means;
   control means for receiving said image information pieces and said corresponding information directing the display state from said reading means and for controlling said display means to display said image information pieces in accordance with said corresponding information directing the display state;
   said image information being binary image data representing a plurality of pixels, said display means including means for displaying said image data in color; and said control means including register means for specifying color signals and a selector receiving said corresponding information directing the display state for selecting the color specifying signals and for providing an output to said display means to display said image information pieces in accordance with said corresponding information directing the display state.

2. An image information display system according to claim 1, wherein said image information storage means includes first and second separate storage regions, wherein said first region stores said plurality of unit image information, and said second region stores said corresponding information directing the display state.

3. An image information display system according to claim 2, wherein said second region of said image information storage means further stores information specific for each of said plurality of unit image information and information specific for each of said plurality of image information pieces including a flag region for storing said corresponding information directing the display state.

4. An image information display system, comprising:
   image information storage means for storing image information including a plurality of unit image information having image information pieces and for storing corresponding information directing a display state of each of said image information pieces, wherein the directed display state is different for predetermined ones of said image information pieces as compared with the display state of the other of said image information pieces;
   display means for consecutively displaying a plurality of said image information pieces at predetermined time intervals;
   means for successively reading out a plurality of said image information pieces and said corresponding information directing the display state stored in said image information storage means;
   control means for receiving said image information pieces and said corresponding information directing the display state from said reading means and for controlling said display means to display said image information pieces in accordance with said corresponding information directing the display state; and
   said image information being binary image data representing a plurality of pixels; said display means including means for displaying said image data with variable luminance;
   said control means including means for generating an emphasis signal in accordance with said corresponding information directing the display state; and
   a luminance modulation circuit receiving said emphasis signal for outputting a luminance modulation signal to said display means for modulating the luminance of display of said image information pieces in accordance with said corresponding image information directing the display state.

5. An image information display system, comprising:
   image information storage means for storing image information including a plurality of unit image information having image information pieces and for storing corresponding information directing a display state of each of said image information pieces, wherein the directed display state is different for predetermined ones of said image information pieces as compared with the display state of the other of said image information pieces;
   display means for consecutively displaying a plurality of said image information pieces at predetermined time intervals;
   mean for successively reading out a plurality of said image information pieces and said corresponding information directing the display state stored in said image information storage means;
   control means for receiving said image information pieces and said corresponding information directing the display state from said reading means and for controlling said display means to display said image information pieces in accordance with said corresponding information directing the display state; and
   said image information being binary image data representing a plurality of pixels; said display means including means for displaying a monochrome image of said image data; and said control means including black and white specifying signal generation registers, and a selector receiving said corresponding information directing the display state for selecting the black and white specifying signals and for providing an output signal to said display means to display said image information pieces in one of normal video and inverse video in accordance with said corresponding information directing the display state.

6. An image information display system, comprising:

image information storage means for storing image information including a plurality of unit image information having image information pieces and for storing corresponding information directing a display state of each of said image information pieces, wherein the directed display state is different for predetermined ones of said image information pieces as compared with the display state of the other of said image information pieces;

display means for consecutively displaying a plurality of said image information pieces at predetermined time intervals;

means for successively reading out a plurality of said image information pieces and said corresponding information directing the display state stored in said image information storage means;

control means for receiving said image information pieces and said corresponding information directing the display state from said reading means and for controlling said display means to display said image information pieces in accordance with said corresponding information directing the display state; and said image information being binary image data representing a plurality of pixels;

said display means including means for displaying a steady state and a blinking image of said image data;

said control means including a circuit for generating an image blinking signal in accordance with said corresponding information directing the display state; and said control means receiving said image blinking signal and said image information pieces and providing an output to said display means to display said image information pieces in one of a steady state and blinking image in accordance with said corresponding information directing the display state.

* * * * *